United States Patent
Yasumoto

(10) Patent No.: US 7,596,342 B2
(45) Date of Patent: Sep. 29, 2009

(54) DRIVE TRANSMISSION DEVICE AND IMAGE FORMING APPARATUS EQUIPPED WITH THE DEVICE

(75) Inventor: Takeshi Yasumoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 11/757,257

(22) Filed: Jun. 1, 2007

(65) Prior Publication Data

US 2008/0000744 A1    Jan. 3, 2008

(30) Foreign Application Priority Data

Jun. 14, 2006    (JP) .............................. 2006-164713

(51) Int. Cl.
*G03G 15/00* (2006.01)

(52) U.S. Cl. .................. 399/167; 192/3.21; 399/88; 399/227

(58) Field of Classification Search ................ 399/167, 399/88, 227, 388; 192/3.21, 3.23
See application file for complete search history.

(56) References Cited

U.S. PATENT DOCUMENTS

| 5,358,084 | A | * | 10/1994 | Schramm | 192/21.5 |
| 5,745,832 | A | * | 4/1998 | Yoshiuchi | 399/384 |
| 5,875,740 | A | * | 3/1999 | Ban et al. | 122/26 |
| 2004/0062571 | A1 | * | 4/2004 | Moritani | 399/227 |
| 2005/0281586 | A1 | * | 12/2005 | Ohashi et al. | 399/167 |

FOREIGN PATENT DOCUMENTS

| JP | 63-318326 A | * | 12/1988 |
| JP | 6-107026 A | | 4/1994 |
| JP | 6-185545 A | | 7/1994 |
| JP | 7-174168 A | | 7/1995 |
| JP | 07-197897 A | * | 8/1995 |
| JP | 09-100865 A | * | 4/1997 |
| JP | 9-126256 A | | 5/1997 |
| JP | 09-151968 A | * | 6/1997 |
| JP | 9-273575 A | | 10/1997 |
| JP | 10-081210 A | * | 3/1998 |
| JP | 2005-195171 A | | 7/2005 |

OTHER PUBLICATIONS

Machine translation of JP 06-185545 A dated Mar. 18, 2009.*
Machine translation of JP 09-126256 A dated Mar. 18, 2009.*
Machine translation of JP 09-273575 A dated Mar. 18, 2009.*

* cited by examiner

*Primary Examiner*—Sophia S Chen
(74) *Attorney, Agent, or Firm*—Canon U.S.A., Inc. I.P. Division

(57) ABSTRACT

A drive transmission device includes a drive source, a drive shaft receiving a drive force from the drive source, a driven shaft connected to the drive shaft so as to transmit the drive force, a conductive housing having an electro-rheological fluid sealed therein, an applying unit configured to apply an electric field to the electro-rheological fluid, and a selecting unit configured to select between a first mode and a second mode, the first mode permitting the applying unit to apply the electric field to the electro-rheological fluid with the drive shaft and the driven shaft functioning as electrodes, the second mode permitting the applying unit to apply the electric field to the electro-rheological fluid with the driven shaft and the housing functioning as electrodes.

8 Claims, 4 Drawing Sheets

DRIVE TRANSMISSION DEVICE AND IMAGE FORMING APPARATUS EQUIPPED WITH THE DEVICE

BACKGROUND OF THE INVENTION

1. Field of the Invention

The present invention relates to a drive transmission device that connects a drive shaft to a driven shaft in order to transmit a drive force from a drive source, and also relates to an image forming apparatus, such as a printer and a copier, equipped with the drive transmission device.

2. Description of the Related Art

Generally, a typical mechanical apparatus has a drive source, such as a motor and an engine, which generates a drive force. In such a device, the drive force of the drive source is transmitted from a drive shaft to a driven member through a drive transmission mechanism, such as a gear, a timing belt, and a clutch. Specifically, in a case where the rotating speed of the driven member is to be made adjustable or speed control is to be performed, which includes speed increasing and decreasing, it is necessary to set a reduction gear ratio by means of a complicated gear arrangement or to control the rotating speed of the drive source.

However, a complicated gear arrangement can lower the drive transmission efficiency and generate vibration resulting from gear mesh frequency. Furthermore, the rotating-speed control of the drive source depends heavily on the torque characteristics of the drive source itself, which implies that there is a limitation on the effective rotating-speed range. Especially in a case where the drive source is a motor, there is a limitation on the responsiveness, such as the activation time. Although there is known a technique that employs a clutch to switch between drive modes, this technique can be problematic in that it must be taken into consideration a transmission shock occurring at the time of on/off switching of the drive modes and abrasion occurring in the transmission portion.

As a device that achieves higher drive transmissibility without the various limitations created in above-described devices that employ mechanical drive transmission mechanisms, a drive transmission device that employs an electro-rheological (ER) fluid is known. An electro-rheological fluid is a kind of fluid whose viscosity changes instantaneously and reversibly in accordance with an electric field intensity applied thereto. Generally, the viscosity of an electro-rheological fluid increases with increasing electric field intensity.

Japanese Patent Laid-Open No. 6-107026 and Japanese Patent Laid-Open No. 2005-195171 disclose examples of a clutch which includes a drive member and a driven member that are engaged to each other but have a gap therebetween that is filled with an electro-rheological fluid. In these examples, the viscosity of the electro-rheological fluid, namely, the slippage between the drive member and the driven member, can be controlled by changing the electric field intensity applied to the electro-rheological fluid. Similarly, Japanese Patent Laid-Open No. 7-174168 discloses an example of a coupling that utilizes the viscosity changeability of the electro-rheological fluid to control transmission distribution of a drive force.

These drive transmission devices employing an electro-rheological fluid are characterized in that a drive shaft and a driven shaft are linked to each other in a slipping fashion. In other words, a state of a half clutch can be controlled very smoothly and stably. In contrast, in a mechanical clutch mechanism, vibration and abrasion occur since clutch plates slide against each other in a half clutch state, and it is thus difficult to stably maintain the slippage between the clutch plates. The use of an electro-rheological fluid however allows for stable maintainability of the slippage in accordance with the applied electric field intensity.

Consequently, the use of an electro-rheological fluid, whose viscosity changes continuously with good responsiveness, allows for transmissibility of a drive force by a required amount, whereby vibration and abrasion occurring from connected driving can be reduced. Moreover, the use of an electro-rheological fluid also allows for driving methods such as gearless driving and motor control-free driving by half clutch control.

However, simply controlling the slippage between the drive shaft and the driven shaft is not sufficient if the speed of the driven member is to be changed within a short period of time or if the rotating speed of the driven member is to be controlled precisely to a constant rate. This is because, although increasing the rotating speed can be readily achieved by increasing the viscosity of the electro-rheological fluid, decreasing the rotating speed requires a separate brake mechanism for arbitrarily controlling the rotating speed to a lower rate. This means that even when the electric field is cut off, namely, when the clutch becomes completely in a disengaged state, the driven member will continue to rotate due to inertia and will not slow down right away.

If a precise operation, such as changing the rotating speed of the driven member within, for example, several tens of milliseconds, is not necessary, a sufficient effect can be achieved without a brake mechanism. However, in the case of a mechanical apparatus such as an image forming apparatus in which the rotation accuracy and timing of an image bearing member or a sheet conveying roller are extremely important and require precision, the control will not be sufficient without a brake mechanism in terms of time.

Although it is possible to provide the apparatus with an additional brake mechanism that is separate from the drive transmission device so that the driven member can be decelerated or stopped within a short period of time, the additional brake mechanism will result in an increase in the size of the apparatus as well as the costs.

SUMMARY OF THE INVENTION

The present invention provides a compact drive transmission device that employs an electro-rheological fluid, whose viscosity is changeable in accordance with the applied electric field intensity, so that the device has both a drive transmission function for between a drive shaft and a driven shaft and a brake function for the driven shaft.

An aspect according to the present invention provides a drive transmission device that includes a drive source, a drive shaft receiving a drive force from the drive source, a driven shaft connected to the drive shaft so as to transmit the drive force, a conductive housing having an electro-rheological fluid sealed therein, an applying unit configured to apply an electric field to the electro-rheological fluid, and a selecting unit configured to select between a first mode and a second mode, the first mode permitting the applying unit to apply the electric field to the electro-rheological fluid with the drive shaft and the driven shaft functioning as electrodes, the second mode permitting the applying unit to apply the electric field to the electro-rheological fluid with the driven shaft and the housing functioning as electrodes.

Further features and aspects of the present invention will become apparent from the following description of exemplary embodiments with reference to the attached drawings.

DESCRIPTION OF THE EMBODIMENTS

Various exemplary embodiments of the present invention will now herein be described with reference to the drawings. The dimensions, materials, shapes, and relative positions of components described in the exemplary embodiments are not specifically limited, and the present invention is not intended to be limited to the exemplary embodiments.

First Exemplary Embodiment

Figure 1:
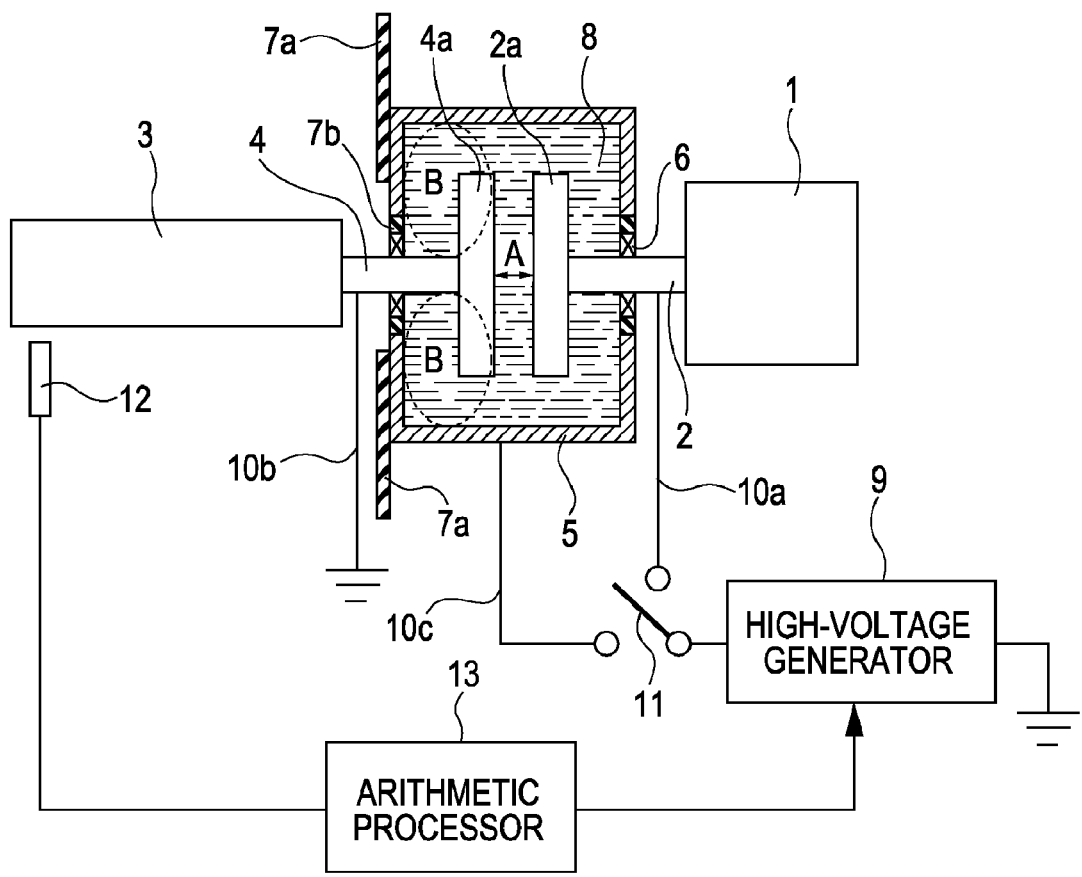
FIG. 1 is a cross-sectional view showing a linked portion between a drive shaft and a driven shaft of a drive transmission device according to an exemplary aspect of the present invention.

A drive transmission device according to a first exemplary embodiment of the present invention will be described below with reference to FIG. 1. FIG. 1 illustrates a drive transmission portion of a generic mechanical apparatus, and is a schematic cross-sectional view of a linked portion between a drive shaft and a driven shaft.

A drive source 1 is a device that generates a drive force, such as a motor or an engine. The drive force generated by the drive source 1 is output in the form of rotation of a drive shaft 2. On the other hand, a driven member 3 may be of any type of object to be rotated for an operation functionally associated with the mechanical apparatus. The driven member 3 rotates integrally with a driven shaft 4 provided coaxially on the driven member 3.

The drive shaft 2 and the driven shaft 4 respectively have plate-shaped segments 2a and 4a on their ends. The plate-shaped segments 2a and 4a are supported within a casing 5 serving as a housing in a manner such that they face each other in a non-contact fashion by being separated from each other by a gap A. The casing 5 is fixed in a non-rotatable fashion to, for example, a frame through an insulating member 7a. The drive shaft 2 and the driven shaft 4 are supported by shaft bearings 6 in a rotatable fashion with respect to the casing 5.

The drive shaft 2, the driven shaft 4, and the casing 5 are all composed of a conductive material. The shaft bearings 6 are mounted to the casing 5 through insulating members 7b, whereby the drive shaft 2, the driven shaft 4, and the casing 5 are electrically insulated from each other.

The internal space of the casing 5 has an electro-rheological fluid 8 sealed therein, and the casing 5 is sealed with a seal member, not shown. The electro-rheological fluid 8 is a kind of fluid whose viscosity changes instantaneously and reversibly in accordance with an electric field intensity applied thereto. Generally, the electro-rheological fluid 8 has properties in which its viscosity increases with increasing electric field intensity.

There are two main types of electro-rheological fluids, namely, a dispersion-type electro-rheological fluid having dielectric fine particles dispersed in insulative base oil and a homogeneous-type electro-rheological fluid which is a single fluid in which molecules are oriented anisotropically by electrolysis. Whichever one of these types may be selected in accordance with suitable characteristics. In the first embodiment, a dispersion-type electro-rheological fluid is used.

A high-voltage generator 9 is provided for applying an electric field to the electro-rheological fluid 8. An electric-field applying line 10a is connected to the drive shaft 2, an electric-field applying line 10b is connected to the driven shaft 4, and an electric-field applying line 10c is connected to the casing 5. Furthermore, a switch 11 is provided for selecting between the electric-field applying lines 10a and 10c.

The drive transmission device shown in FIG. 1 also includes a rotation sensor 12. With the rotation sensor 12, the rotating speed of the driven member 3 can be constantly monitored. A signal from the rotation sensor 12 is sent to an arithmetic processor 13 and is ultimately fed back as a signal for controlling the high-voltage generator 9 and the switch 11.

The principle of operation of the drive transmission device shown in FIG. 1 will now be described. The following description is based on the assumption that the drive source 1 is activated such that the drive shaft 2 rotates at a predetermined rotating speed while generating torque. In a state where an electric field is not applied to the electro-rheological fluid 8, the fine particles are homogeneously dispersed as shown in FIG. 1. Thus, the viscosity of the electro-rheological fluid 8 is generally low, which implies that the drive shaft 2 rotates solely in an idling fashion.

Figure 2:
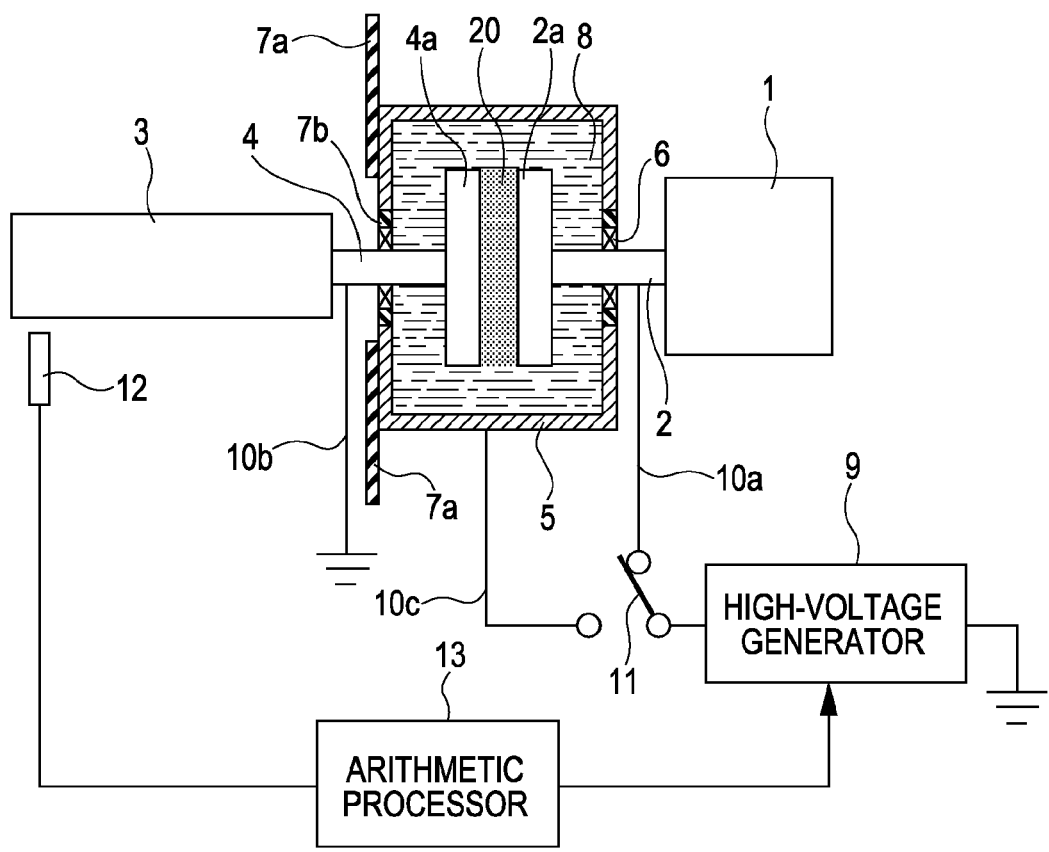
FIG. 2 schematically illustrates a state of an electro-rheological fluid when an applied voltage is for a clutch mode according to an exemplary aspect of the present invention.

In contrast, when the high-voltage generator 9 is activated and the electric-field applying line 10a is selected using the switch 11, an electric field is applied to the electro-rheological fluid 8 with the drive shaft 2 and the driven shaft 4 functioning as electrodes. In this case, referring to FIG. 2, the fine particles of the electro-rheological fluid in the gap A between the electrodes are polarized in response to the applied voltage and thus form a chain-like cluster 20 in the direction of the electric field, whereby the apparent viscosity changes instantaneously. As a result, viscous resistance (shear resistance) is generated between the plate-shaped segments 2a and 4a, whereby the electro-rheological fluid 8 existing in the gap A functions as a clutch. Consequently, the drive force of the drive shaft 2 is transmitted to the driven shaft 4 and the driven member 3.

The degree of drive transmission, namely, the rotating speed of the driven member 3, can be readily adjusted by controlling the slippage between the plate-shaped segments 2a and 4a. Specifically, this controlling of the slippage involves adjusting the intensity applied by the high-voltage generator 9 and is based on the fact that the viscosity changeable range of the electro-rheological fluid extends wide between a fluid state and a substantially solid state.

Accordingly, when a high rotating speed is required, the applied intensity is raised to increase the viscosity so that the plate-shaped segments 2a and 4a are substantially coupled to each other. In contrast, when a low rotating speed is required, the applied intensity is lowered to reduce the viscosity so that a slippage inhibits transmission of an undesired drive force. In addition, since the viscosity changes continuously in accordance with the applied intensity, there is only little shock produced as a result of drive transmission. This is especially effective under a complicated sequence where a speed-changing operation for increasing or decreasing the speed or an on/off operation of a clutch is frequently required.

Figure 3:
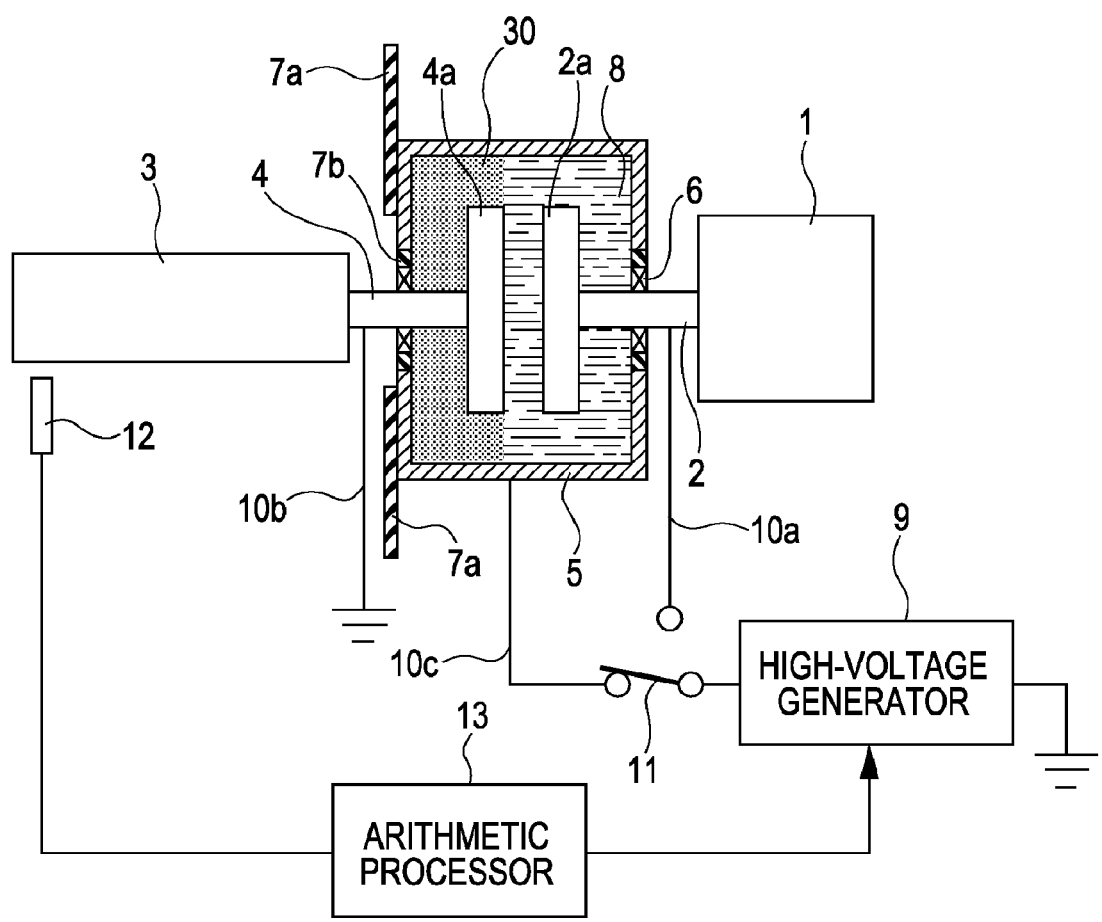
FIG. 3 schematically illustrates a state of the electro-rheological fluid when the applied voltage is for a brake mode according to an exemplary aspect of the present invention.

On the other hand, when the electric-field applying line 10c is selected using the switch 11, an electric field is applied to the electro-rheological fluid 8 with the casing 5 and the driven shaft 4 functioning as electrodes. In this case, referring to FIG. 3, the fine particles of the electro-rheological fluid 8 in a region B (see FIG. 1) between the electrodes are polarized in response to the applied voltage and thus form a chain-like cluster 30 in the direction of the electric field, whereby the apparent viscosity changes instantaneously. As a result, viscous resistance (shear resistance) is generated between the driven shaft 4 and the casing 5, whereby the electro-rheological fluid 8 existing in the region B functions as a brake against the rotating driven shaft 4.

Similar to the above-described case where the electro-rheological fluid 8 functions as a clutch, the degree of braking can be readily adjusted by controlling the slippage between the driven shaft 4 and the casing 5, which involves adjusting the intensity applied by the high-voltage generator 9. In addition, since the viscosity changes continuously in accordance with the applied intensity, there is only little shock produced as a result of the braking operation. This is especially effective under a complicated sequence where a speed-changing operation for increasing or decreasing the speed is frequently required.

The rotation control of the driven member implemented on the basis of the electro-rheological-fluid clutch-and-brake integral unit according to the present invention will now be described. As shown in FIG. 1, the rotation sensor 12 monitors the rotating speed of the driven member 3, and the arithmetic processor 13 determines how much faster or slower the driven member 3 is rotating with respect to a predetermined rotating speed. The relationship between the electric field intensity to be applied and the viscosity of the electro-rheological fluid is preliminary determined, and moreover, the relationship between the degree of viscous resistance and the degree of drive transmission or the degree of braking is preliminarily input to the arithmetic processor 13 in the form of a data table.

Accordingly, based on a signal output from the rotation sensor 12, the arithmetic processor 13 performs a calculation to determine whether to set the switch 11 on the clutch side or the brake side and to determine how much voltage is to be applied by the high-voltage generator 9, and performs feedback as a command.

According to the drive transmission device in the first embodiment, the rotating speed of the driven member can be controlled arbitrarily by utilizing the viscosity of the electro-rheological fluid. Therefore, the device can be expected to be effective for a gearless configuration or a drive-source control-free configuration. Furthermore, because the clutch mechanism and the brake mechanism are integrated into a single unit, the entire drive system including the drive transmission device can be made compact and simple.

In addition, since the response rate for the viscosity change of an electro-rheological fluid is extremely high, namely, several milliseconds, the electro-rheological fluid is advantageous in terms of controllability over conventional examples where the gear switching and the rotating-speed switching of a motor are implemented using a mechanical unit. Furthermore, although requiring a high voltage of about 2 to 3 kV/mm, an electro-rheological fluid requires a low electric current density of 5 to 10 $\mu A/cm^2$. Therefore, an electro-rheological fluid contributes to relatively low power consumption.

In the first embodiment, the ends of the drive shaft 2 and the driven shaft 4 are respectively provided with the simple plate-shaped segments 2a and 4a that face each other. Alternatively, for example, the ends may be provided with a plurality of fins or may be made engageable with each other so as to attain a large shear resistance with respect to the electro-rheological fluid. Furthermore, although an electro-rheological fluid is used in the first embodiment, a magneto-rheological (MR) fluid having similar properties may be used as an alternative. In that case, magnetic poles are provided in place of electrodes, and a magnetic field is applied in place of an electric field, so that the viscosity of the applied sections can be changed locally, whereby similar advantages can be achieved.

Second Exemplary Embodiment

Figure 4:
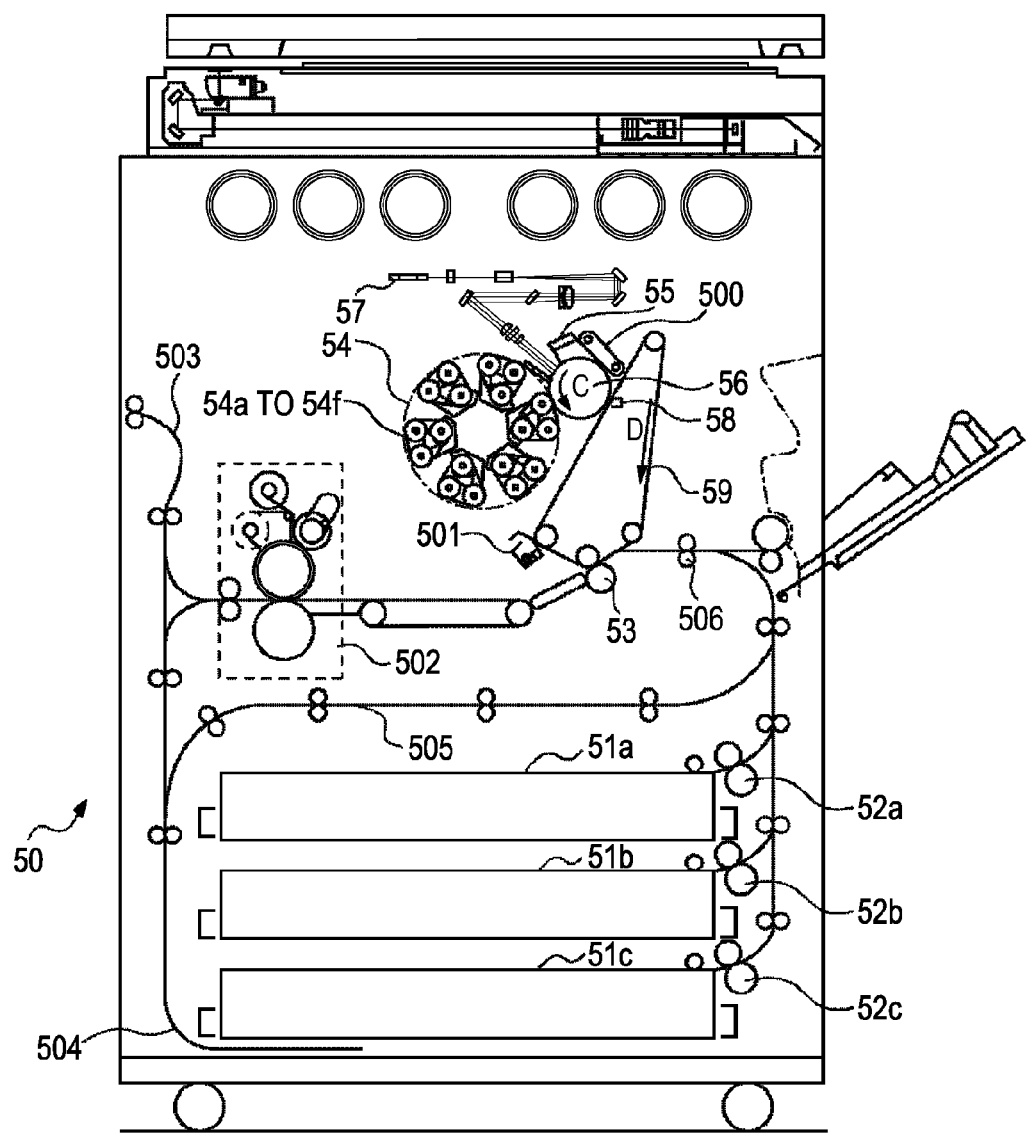
FIG. 4 is a cross-sectional view of an image forming apparatus according to an exemplary aspect of the present invention.

An image forming apparatus equipped with an drive transmission device according to a second exemplary embodiment of the present invention will now be described. FIG. 4 is a cross-sectional view of an electrophotographic image forming apparatus. Electrophotographic image forming apparatuses can have various configurations depending on the number of colors used, the number of photosensitive members, or differences in transfer methods. Of these examples, a full-color image forming apparatus is shown in FIG. 4. An image forming apparatus 50 has a plurality of paper feed cassettes 51a to 51c containing sheets of paper or the like. From an arbitrarily selected one of the paper feed cassettes, a paper feed roller (one of paper feed rollers 52a to 52c) conveys a sheet towards a secondary transfer section 53.

An image forming operation performed in conjunction with the paper feeding operation will be described below. The image forming apparatus shown in FIG. 4 is of an intermediate transfer type that includes a rotary developing device 54 having annularly-arranged toner developing units 54a to 54f for six different colors, and includes only a single photosensitive member.

First, a surface of a photosensitive member 56 rotating in the direction of an arrow C in FIG. 4 is uniformly charged by a charging device 55, and an electrostatic latent image of a first color is formed on the surface by an exposure device 57. The electrostatic latent image is made visible as a toner image of the first color by one of the developing units 54a to 54f of the rotary developing device 54 that is disposed at a position (development position) facing the photosensitive member 56.

The visible toner image is electrostatically transferred onto an intermediate transfer belt 59 by a primary transfer device 58 and is conveyed in the direction of an arrow D. A residual transfer toner that was not transferred in the primary transfer process and thus left on the photosensitive member 56 is removed by a drum cleaner 500.

The above-described process corresponds to an image forming cycle for one color. In the case of the image forming apparatus shown in FIG. 4, the rotary developing device 54 is rotated in a color-by-color basis so that the similar image forming cycle is repeated for six colors. In this case, the primary transfer device 58 transfers toner images of different colors sequentially on top of each other on the intermediate transfer belt 59 so that when six cycles are completed, a full color toner image is formed.

When the primary transfer process for the sixth color is completed, the full color toner image is electrostatically transferred onto the sheet conveyed to the secondary transfer section 53 by the aforementioned paper feeding operation. The secondary transfer section 53 includes a nip portion defined by, for example, a pair of rollers. For times other than when full color toner images pass through the rollers, these rollers are basically separated from each other so as to prevent them from impairing the images.

A residual transfer toner not transferred to the sheet at the time of the secondary transfer process and thus left on the intermediate transfer belt 59 is removed by a belt cleaner 501. Subsequently, the sheet having the full color toner image thereon is conveyed to a fixing device 502 where the toner image is fixed to the sheet with heat and pressure, whereby the toner image exhibits colors. As a result, a desired full color fixed image is attained.

Subsequently, an ejection mode or a double-face recording mode is selected. When the ejection mode is selected, the sheet is ejected from the apparatus by being conveyed through an ejection conveying path 503. On the other hand, when the double-face recording mode is selected, the sheet has its leading and trailing ends reversed in a reversal conveying path 504 and is then conveyed through a double-face conveying path 505 so that a toner image is formed on the rear face of the sheet.

The above-described series of steps performed in the image forming apparatus is precisely and complexly controlled in accordance with the required image quality and productivity. For example, the driving of the image forming portion should be given extra care since vibration or irregular rotation in the drive transmission portion can directly affect the image quality of the printed product.

This will be described in detail with reference to the structure of the image forming apparatus in FIG. 4. Specifically, because the switching operation of the rotary developing device 54 is performed frequently, vibrations exerted on the photosensitive member 56 or the exposure device 57 due to a repetition of sudden speed increases and sudden stops is of great concern.

As a countermeasure for alleviating such vibrations, there is known a technique for optimizing a speed adjustment table for a motor that serves as a drive source. However, since there are limitations on the activation time period of the motor, this technique is limited in view of achieving higher productivity. There is also known another technique in which a dynamic damper is provided on a rotary shaft of the rotary developing device 54. However, this technique is only effective to specific frequencies, and for this reason, the technique lacks flexibility if the speed of the image forming process is to be changed in accordance with the basic weight of the sheet or the type of image.

In this embodiment, the drive transmission device shown in FIG. 1 is employed so as to link the rotary shaft (i.e. driven shaft) of the rotary developing device 54 with the motor (i.e. drive shaft) that drives the rotary shaft. This allows for smooth drive transmission and smooth braking, owing to the continuous viscosity changing properties of the electro-rheological fluid. Thus, the rotary developing device 54 can be accelerated and stopped smoothly. In addition, since the response rate for the viscosity change is extremely high, namely, several milliseconds, this configuration is less apt to become a limitation against achieving higher productivity.

Furthermore, the driving of the image bearing members, such as the photosensitive member 56 and the intermediate transfer belt 59, should also be given extra care since rotational accuracy can significantly affect the image quality. Examples of adverse effects caused by rotational inaccuracy are irregular images resulting from gear mesh frequency and expanded or contracted images resulting from peripheral-velocity fluctuation. Consequently, the drive transmission device shown in FIG. 1 can be employed so as to link each of drive rotary shafts (i.e. driven shafts) of the photosensitive member 56 and the intermediate transfer belt 59 with a motor shaft (i.e. drive shaft) that drives these drive rotary shafts. This allows for controlling of the rotating speed with a half clutch system, whereby irregular images can be effectively prevented by gearless driving.

As already described above with reference to FIG. 1, the use of the rotation sensor 12 allows for clutch and brake control with respect to irregular rotations, whereby the irregular rotations can be effectively cancelled.

In addition to the image forming portion, the drive transmission device shown in FIG. 1 is also effective when used in the sheet conveying portion. Referring to FIG. 4, just before reaching the secondary transfer section 53, the sheet undergoes a timing adjustment with respect to an image on the intermediate transfer belt 59 and a skew correction by a registration device 506.

For these reasons, there are often cases where the registration device 506 requires a complicated sequence, which includes sudden speed increase and sudden stopping of conveying rollers, speed adjustment in accordance with an image timing, and a separating operation of a conveying unit to release a nip portion. It is needless to say that the more the image forming apparatus requires high image quality and high productivity, the more this operation sequence becomes an important feature of the apparatus, whereas it is also a fact that this operation sequence becomes more difficult due to limitations in the motor performance.

Consequently, by using the drive transmission device shown in FIG. 1 in the conveying unit that has an important function, such as the registration device 506, a speed-changing operation can be implemented in a wider range with better responsiveness. Accordingly, this configuration can correspond to the operation sequence essential to achieving high image quality and high productivity.

Although the image forming portion and the conveying portion have been described separately in the above description, an advantage achieved in common between the image forming portion and the conveying portion is the space-saving and simplified design of the drive transmission portion. In particular, because the drive transmission device has both a clutch function and a brake function within the linked portion between the drive shaft and the driven shaft, the device has an extremely compact structure. Accordingly, this is advantageous in that the entire image forming apparatus can be reduced in size.

Although the second embodiment is described with reference to the image forming apparatus shown in FIG. 4 as an example of an image forming apparatus, the basic functions required in the image forming portion and the conveying portion are the same for image forming apparatuses of different configurations. Accordingly, the second embodiment can be similarly applied to image forming apparatuses of different configurations to exhibit similar advantages.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-164713 filed Jun. 14, 2006, which is hereby incorporated by reference herein in its entirety.

What is claimed is:

1. A drive transmission device comprising:
   a drive source;
   a drive shaft adapted to receive a drive force from the drive source;
   a driven shaft connected to the drive shaft so as to transmit the drive force;

a conductive housing having an electro-rheological fluid sealed therein;

an applying unit configured to apply an electric field to the electro-rheological fluid; and a switching unit configured to switch an electric-field applying line by the applying unit between a first electric-field applying line and a second electric-field applying line, the first electric-field applying line having the drive shaft and the driven shaft functioning as electrodes, the second electric-field applying line having the driven shaft and the housing functioning as electrodes, wherein the drive force is transmitted from the drive source to the driven shaft when the first electric-field applying line is selected by the switching unit, and the rotation of the driven shaft is braked when the second electric-field applying line is selected.

2. The drive transmission device according to claim 1, wherein the housing is fixed in an insulated and non-rotatable manner.

3. The drive transmission device according to claim 1, wherein the drive shaft and the driven shaft are disposed facing each other within the housing, the two shafts being separated from each other by a gap so as to be given shear surfaces.

4. The drive transmission device according to claim 1, wherein the drive shaft and the driven shaft are rotatably supported by the housing through insulating members.

5. The drive transmission device according to claim 1, further comprising:

a sensor configured to detect a rotational state of the driven shaft; and a controller configured to control a selecting operation by the selecting unit and to adjust an intensity of the electric field from the applying unit on the basis of a signal from the sensor so as to control a rotating speed of the driven shaft.

6. An image forming apparatus including an image bearing member, the image forming apparatus comprising:

a drive transmission device provided on a rotary shaft of the image bearing member, the drive transmission device including, a drive source;

a drive shaft adapted to receive a drive force from the drive source;

a driven shaft connected to the drive shaft so as to transmit the drive force;

a conductive housing having an electro-rheological fluid sealed therein;

an applying unit configured to apply an electric field to the electro-rheological fluid; and a selecting unit configured to select between a first mode and a second mode, the first mode permitting the applying unit to apply the electric field to the electro-rheological fluid with the drive shaft and the driven shaft functioning as electrodes, the second mode permitting the applying unit to apply the electric field to the electro-rheological fluid with the driven shaft and the housing functioning as electrodes.

7. An image forming apparatus including a rotary developing device, the image forming apparatus comprising:

a drive transmission device provided on a rotary shaft of the rotary developing device, the drive transmission device including, a drive source;

a drive shaft adapted to receive a drive force from the drive source;

a driven shaft connected to the drive shaft so as to transmit the drive force;

a conductive housing having an electro-rheological fluid sealed therein;

an applying unit configured to apply an electric field to the electro-rheological fluid; and a selecting unit configured to select between a first mode and a second mode, the first mode permitting the applying unit to apply the electric field to the electro-rheological fluid with the drive shaft and the driven shaft functioning as electrodes, the second mode permitting the applying unit to apply the electric field to the electro-rheological fluid with the driven shaft and the housing functioning as electrodes.

8. An image forming apparatus including a sheet conveying roller, the image forming apparatus comprising:

a drive transmission device provided on a rotary shaft of the sheet conveying roller, the drive transmission device including, a drive source;

a drive shaft adapted to receive a drive force from the drive source;

a driven shaft connected to the drive shaft so as to transmit the drive force;

a conductive housing having an electro-rheological fluid sealed therein;

an applying unit configured to apply an electric field to the electro-rheological fluid; and a selecting unit configured to select between a first mode and a second mode, the first mode permitting the applying unit to apply the electric field to the electro-rheological fluid with the drive shaft and the driven shaft functioning as electrodes, the second mode permitting the applying unit to apply the electric field to the electro-rheological fluid with the driven shaft and the housing functioning as electrodes.

* * * * *